United States Patent Office.

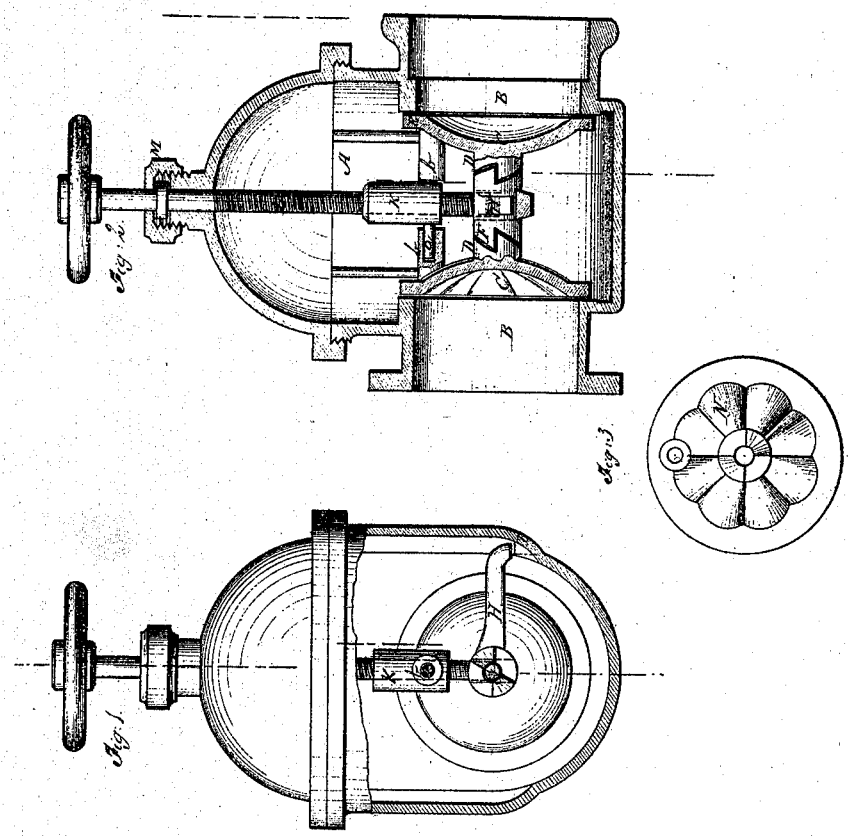

JOHN PATERSON, OF TROY, NEW YORK.

Letters Patent No. 95,260, dated September 28, 1869.

---

IMPROVEMENT IN STOP-VALVES.

---

The Schedule referred to in these Letters Patent and making part of the same.

---

*To all whom it may concern:*

Be it known that I, JOHN PATERSON, of Troy, in the county of Rensselaer, and State of New York, have invented a new and useful Improvement in Stop-Valves; and I do hereby declare that the following is a full, clear, and exact description thereof, which will enable others skilled in the art to make and use the same, reference being had to the accompanying drawings, forming part of this specification.

The object of this invention is to provide new and useful improvements in the construction of stop-valves for steam, water, and other pipes.

The invention comprises a pair of sliding gates, suspended from a stem, working up and down in a chamber at the ends of the two pipe-connections, and a cam-screw, or inclined plane, arranged between the said gates, by which when they have arrived at their seats on the ends of the said pipes, they are pressed down tightly thereon, and which releases the said pressure as soon as the valve-stem is raised a small amount in the direction for opening the gates.

It also comprises an improved construction of the gates or valves, intended to strengthen the same, as is hereinafter more fully specified.

Figure 1 represents an elevation of my improved stop-valve partly sectioned;

Figure 2 represents a longitudinal sectional elevation of the same; and

Figure 3 represents a view of one of the valves.

Similar letters of reference indicate corresponding parts.

A represents the chamber into which the joints B, whereon the pipe-connections are made, open at points opposite each other, and have their ends fitted for the seats of sliding valves, or gates.

C represents the valves, which are of concavo-convex form, and have stems D projecting inward from the convex backs and rims E on the other side, fitted truly to the ends of the connections B.

The inner ends of these stems have cam-faces, or inclined planes or wedges, and are fitted to work against reversely-operating cam-faucets, on an oscillating block, F, supported between the stems of each valve on trunnions C, which enter sockets or holes formed in the ends of the block F, and having an arm, H, projecting laterally to one side of the chamber, to be arrested by a stop, I, thereon, at the proper time when the valves are being closed, so as to oscillate the said block F, and force the valves against their seats.

Instead of these cams or inclined planes, the stems at the rear of the valves may be screwed externally or internally, and the oscillating block F may be correspondingly fitted thereto.

The valves are suspended from a screwed sleeve or nut, K, on the stem L, for raising or lowering them, in a manner to admit them to move laterally.

The means of suspension consist of two pins, a, which project from opposite sides of the sleeve K, at right angles to the same, and enter the cylindrical socket-stems b formed on the upper portion of the valves.

The stem L rises up through a stuffing-box, M, where it is confined by a collar against end movement. It moves the valves up or down by screwing the nut K in either direction.

To admit of raising the block E upward, it is provided with a hole through it, coincident with the screw, for the latter to pass through, and to permit of turning the said block, the said hole is made larger than the stem L.

It is not, however, intended that the stem L shall be of sufficient length to reach the block F, (while the same is being raised,) until the arm H shall have been raised off its stop or rest, and hence the cam-faces of the block relieved from pressure. Other means of raising and lowering the valves may be employed.

The form of these valves is such as to require but little fitting on the faces, and tu give them great strength to sustain the lateral pressure of the cam-block F; and to further strengthen them, the concavo-convex parts are corrugated, or provided with radiating strengthening-ribs N.

It will be seen that as soon as the valve-stem is raised, the pressure of the valves or gates on their seats is released, and they are free to be raised up or moved down again without other resistance than their weight.

Having thus described my invention,

What I claim as new, and desire to secure by Letters Patent, is—

1. A cam-block, adapted to be oscillated by an arm or lever, and arranged in combination with valves having cam-projections on their backs, substantially as specified.

2. The combination of the valves C and sockets b with pins a and sleeve K, substantially as set forth and shown.

3. The combination of the valves C, cam-stems D, block F, arm H, pins a, sockets b, sleeve K, and stem L, when constructed and arranged substantially as set forth and shown.

JOHN PATERSON.

Witnesses:
GEO. W. MABEE,
ALEX. F. ROBERTS.